March 17, 1959 R. ADLER 2,878,413

TRAVELING-WAVE AMPLIFIERS

Filed Nov. 27, 1953 5 Sheets-Sheet 1

ROBERT ADLER
*INVENTOR.*

BY *Francis W. Crotty*

HIS ATTORNEY.

March 17, 1959 R. ADLER 2,878,413

TRAVELING-WAVE AMPLIFIERS

Filed Nov. 27, 1953

5 Sheets-Sheet 2

ROBERT ADLER
*INVENTOR.*

BY *Francis W. Crotty*

HIS ATTORNEY.

March 17, 1959 R. ADLER 2,878,413

TRAVELING-WAVE AMPLIFIERS

Filed Nov. 27, 1953 5 Sheets-Sheet 3

ROBERT ADLER
*INVENTOR.*

BY Francis W. Crotty

HIS ATTORNEY.

March 17, 1959

R. ADLER 2,878,413

TRAVELING-WAVE AMPLIFIERS

Filed Nov. 27, 1953

5 Sheets-Sheet 4

ROBERT ADLER
*INVENTOR.*

BY Francis W. Crotty

HIS ATTORNEY.

ROBERT ADLER
*INVENTOR.*

BY Francis W. Crotty

HIS ATTORNEY.

2,878,413

TRAVELING-WAVE AMPLIFIERS

Robert Adler, Northfield, Ill., assignor to Zenith Radio Corporation, a corporation of Delaware Application November 27, 1953, Serial No. 394,797

15 Claims. (Cl. 315—3.6)

This invention relates to new and improved amplifiers suitable for use over a relatively wide range of frequencies. More particularly, the invention is directed to amplifiers employing electron-discharge devices of the traveling-wave type and to new and improved traveling-wave tube structures.

With the advent of television broadcasting at frequencies within the ultra-high-frequency range between 490 and 870 megacycles per second, manufacturers of television receivers have found it necessary to provide terminal equipment adapted to receive programs transmitted within this frequency range. One of the most difficult problems presented in the construction of such a television receiver results from the fact that conventional intensity-control electron tubes (triodes, pentodes, etc.) are not well suited for use as amplifiers within the ultra-high-frequency range; more particularly, it is extremely difficult to achieve uniform gain throughout the U. H. F. range with tubes having practical dimensions. Accordingly, it has generally been considered preferable to apply the received signal directly to a heterodyning stage without preliminary radio-frequency amplification. In this event, however, the picture reproduced by the receiver is often seriously disturbed by thermal noise.

One known type of electron-discharge device which is capable of providing amplification over a relatively wide range of high frequencies is the generally known or conventional traveling-wave tube. In these tubes, a radio-frequency signal is applied to a low-velocity wave-transmission line, which, in its simplest form, may comprise a helically wound conductor. An electron stream is directed along a path closely adjacent to the helical line; usually, the electron beam path coincides with the axis of the helix. The velocity of the electrons in the beam is made substantially equal to the effective velocity of the radio-frequency signal wave traveling along the line. The electron beam is velocity-modulated by the electrostatic field developed by the signal wave traveling along the line, and, in turn, induces current in the line which may amplify the radio-frequency signal. However, the known types of traveling-wave tubes are much too large and expensive for use in a television receiver.

A little-known variant of the traveling-wave tube comprises a device adapted for push-pull or transverse operation, as opposed to the longitudinal or velocity-modulation mode of operation employed in the conventional tubes. A transverse-mode traveling-wave tube may comprise a pair of low-velocity wave-transmission lines mounted in substantially parallel spaced relationship with respect to each other. A radio-frequency input signal is applied in push-pull relationship to the two wave-transmission lines, and an electron stream is projected along a path intermediate the lines, the electron velocity being substantially equal to the effective propagation velocity of the signal wave along the length of the lines. Consequently, each electron of the stream is subjected to a transverse electrostatic field which travels along the beam path at approximately the same velocity, and is deflected from its original path toward one of the lines, depending upon the polarity of the field to which it is subjected. The resulting transverse motion of the electrons toward one helix and away from the other helix spreads the originally straight stream into a wave-like pattern and this pattern, moving along the stationary lines, induces currents in the lines which may, in a rather complex manner, tend to reinforce the original radio-frequency signal, so that exponential amplification is attained.

In both conventional and transverse-mode traveling-wave tubes, it is essential that the electron stream be confined to a relatively narrow path so that the electrons will not be collected by the wave-transmission lines. A magnetic field extending throughout the length of the electron beam path is generally employed to confine the electrons to that path and prevent dispersion of the beam. A relatively bulky and expensive electromagnetic coil surrounding the entire traveling-wave tube is usually utilized for this purpose. However, such a structure is not desirable in a television receiver or the like, where space and cost considerations are of paramount importance.

It is a primary object of the invention to provide a new and improved amplifier employing an electron-discharge device of the traveling-wave type and suitable for operation over a relatively wide band of ultra-high frequencies.

It is another principal object of the invention to provide a new and improved electron-discharge device suitable for use in a wide-band U. H. F. amplifier.

It is a further object to provide an electron-discharge device, capable of operating as a broad-band ultra-high-frequency amplifier, which is relatively small in size but which provides an acceptable degree of signal amplification.

It is an additional object of the invention to provide a new and improved electron-discharge device of the traveling-wave type in which the electron stream is effectively confined to a predetermined path without requiring the use of a magnetic collimating field.

It is a corollary object of the invention to provide an electron discharge-device of the traveling-wave type which is relatively simple and expedient to construct and economical to manufacture.

A traveling-wave electron-discharge device constructed in accordance with the invention includes an electron gun having an electron-emissive cathode for projecting a beam of electrons along a reference path of predetermined maximum width. A wave-transmission line is disposed adjacent the reference path and is electrostatically coupled to the electron beam. The wave-transmission line is in the form of a helical conductive winding having a substantially uniform low wave-propagation velocity in a direction parallel to the reference path and further having a length in that direction which is large relative to the effective wavelength of a radio-frequency signal wave traveling along the line. The apparatus includes means for applying a radio-frequency signal to the wave-transmission line to establish the traveling signal wave and thereby provide a traveling electric signal field which propagates along the reference path at the low wave-propagation velocity. Finally, the apparatus includes means, comprising at least a portion of the wave-transmission line, for providing a plurality of convergent electrostatic lenses periodically distributed along the reference path and with a spatial period substantially larger than the spacing intermediate adjacent turns of the helical conductive winding in order to confine the electron beam within the reference path, whereby the beam interacts with the traveling signal wave to provide substantial reinforcement thereof.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures, and in which:

Figure 1 is a cross-sectional view, partially schematic, of one embodiment of an electron-discharge amplifier constructed in accordance with the invention;

Figure 1*a* is an explanatory diagram illustrating certain operational features of the amplifier of Figure 1;

Figure 1:
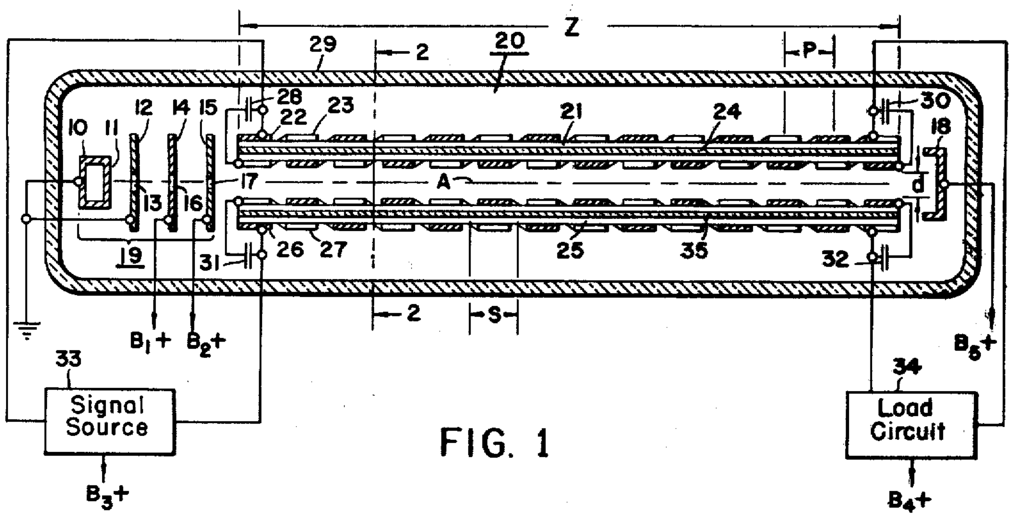

The embodiment of the invention shown in the cross-sectional partially schematic view of Figure 1 comprises an electron-discharge device or traveling-wave tube 20; tube 20 includes a cathode 10 having an emissive surface 11. A focusing electrode 12 is mounted in parallel spaced relationship to surface 11 and includes a centrally located slot 13. An accelerator electrode 14 including an opening 16 is included in device 20 and is positioned adjacent focusing electrode 12 with slot 16 opposite slot 13. A beam-limiting electrode 15 is mounted in spaced relationship to accelerator 14 on the side of the accelerator opposite electrode 12; electrode 15 includes a limiting aperture 17 aligned with opening 16. Cathode 10 and electrodes 12, 14 and 15 comprise an electron gun 19 for projecting an electron beam along a reference path generally indicated by a dash line A comprising the center plane of the path; reference path A terminates at a collector electrode 18 positioned at the opposite end of tube 20.

Preferably, the electron beam developed by gun 19 is sheet-like in form; in other words, the electron beam has one principal cross-sectional dimension which is very much greater than a second principal cross-sectional dimension, these dimensions being determined by the configuration of aperture 17. For the illustrated structure, the lengths of electrodes 10, 12, 14, 15 and 18, taken in a direction perpendicular to the plane of the drawing of Figure 1, are very much greater than the widths of slots 13, 16 and 17, so that the electron beam is of rectangular cross-sectional configuration and has a thickness very much smaller than its height. It should be noted that the invention may be advantageously employed in structures which do not utilize a ribbon or sheet beam; however, a beam of this type is normally quite advantageous in a weak-signal amplifier, due to the fact that it permits realization of increased amplification from a tube of given maximum dimensions.

A first wave-transmission line 21 is disposed intermediate electrode 15 and collector 18 and adjacent reference path A. Transmission line 21 comprises first and second helical conductors 22 and 23 wound in bifilar fashion about a longitudinal support member 24. The individual turns of winding 22 are cross-hatched in the drawing whereas the turns of winding 23, although also shown in cross section, are unshaded in order to distinguish the individual elements of the two windings from each other. It should be understood that the size of the windings has been greatly exaggerated in Figure 1 and in succeeding figures in order to facilitate the presentation of the inventive concept, and that only a relatively few turns of each winding are illustrated as compared to the number which may be employed in practice.

A second low-velocity wave-transmission line 25 is disposed adjacent reference path A opposite line 21. Wave-transmission line 25 is essentially identical, electrically and physically, with line 21, and comprises a pair of bifilar helical conductive windings 26 and 27. Winding 26 is cross-hatched in the drawing and helix 27 is unshaded so that the individual coil elements of the two windings may be readily distinguished. Lines 21 and 25 are preferably equally spaced from the center plane of path A and define the maximum useful width $d$ and length Z of the beam path. Furthermore, the individual elements of winding 22 are positioned directly opposite the corresponding elements of winding 26 and windings 23 and 27 are similarly aligned opposite each other, so that transmission lines 21 and 25 are symmetrical with respect to path A.

Windings 22 and 23 of line 21 are electrically intercoupled for radio frequencies at the end of the line adjacent electron gun 19 by means of a capacitor 28; capacitor 28 is shown mounted within the envelope 29 of tube 20. If preferred, the electrical coupling between the two windings may be made externally of envelope 29, although it is usually more desirable to effect this coupling within the envelope in order to minimize the number of external leads. At the other end of line 21, adjacent collector 18, windings 22 and 23 are again electrically inter-coupled by means of a capacitor 30. Capacitors 28 and 30 constitute effective short circuits at the input signal frequency while isolating the bifilar windings from each other with respect to D. C. or average potential. Similarly, two coupling capacitors 31 and 32 are provided to couple windings 26 and 27 of line 25 to each other at radio frequencies.

Tube 20 may be provided with a suitable base for envelope 29 and an indirect heater element may be included in cathode 10; because these constructional details are familiar in the art, they are not illustrated in the drawing. Envelope 29 may be of conventional receiver-tube size. After wave-transmission lines 21 and 25, collector 18, and the electrodes comprising electron gun 19 have been mounted within envelope 29, the envelope is evacuated and gettered in any manner known in the art.

A simplified external circuit for tube 20 has been schematically illustrated in Figure 1 in order to facilitate the description of the operation of the tube. A balanced signal source 33 is connected between winding 22 of line 21 and winding 26 of line 25. Of course, signal source 33 is also electrically coupled between windings 23 and 27 through capacitors 28 and 31 respectively. Source 33 may comprise any suitable source of radio-frequency signals, and may, for instance, constitute a balanced television antenna. A balanced load circuit 34 is connected between windings 23 and 27 of transmission lines 21 and 25, respectively and is coupled to windings 22 and 26 through capacitors 30 and 32.

Cathode 10 is connected to a source of reference potential, here illustrated as ground, and focusing electrode 12 may also be connected to ground. If preferred, electrode 12 and cathode 10 may be inter-connected inside envelope 29. Accelerator 14 is connected to a first source of unidirectional positive operating potential $B_1+$ and limiting electrode 15 is connected to a second positive voltage source $B_2+$. A third source of positive unidirectional potential, $B_3+$, is connected to signal source 33 to provide a preselected constant average potential for winding 22 of transmission line 21 and winding 26 of line 25. Similarly, a fourth D. C. voltage source $B_4+$ is connected to load circuit 34 to apply a positive D. C. voltage to transmission-line windings 23 and 27. Collector 18 is electrically connected to an additional source of positive potential, $B_5+$. It will be understood, of course, that all of the B+ voltage sources may comprise separate taps on a single unidirectional or D. C. voltage source. Furthermore, some of the B+ potentials (e. g. $B_1+$ and $B_5+$) may be of the same value.

In traveling-wave tubes constructed in accordance with known techniques, common experience indicates that the use of electrodes which intercept any appreciable portion of the electron beam may produce highly undesirable partition-noise effects; accordingly, the electron guns of conventional tubes employ electrode structures in which an attempt is made to avoid interception, by the gun electrodes, of any substantial portion of the beam. One percent interception, for instance, is considered excessive. However, it has been found, surprisingly enough, that these partition-noise effects are not significant in transverse-mode traveling-wave tubes; indeed, electron guns including beam-limiting electrodes which intercept fifty percent or more of the total beam current have been found to provide inherently better noise characteristics, in transverse-mode tubes, than electron guns of the type utilized in conventional tubes. Consequently, in accordance with a feature of the invention, beam-limiting electrode 15 should be constructed to intercept a substantial portion of the total beam current, preferably greater than fifty percent. As seen in the cross-sectional view of Figure 2, the thickness of the electron beam, which is determined by dimension $t$ of limiting aperture 17, is very much smaller than its height, which corresponds to slot dimension $h$, so that the beam has a cross-sectional configuration corresponding to an elongated rectangle. It should be understood that although a rectangular cross-sectional configuration has been illustrated, other beam configurations may be employed. Support member 24, upon which windings 22 and 23 of line 21 are wound, is essentially I-shaped in cross-sectional configuration, and the longitudinal support member 35 upon which winding 26 and 27 are mounted is similarly shaped.

Referring again to Figure 1, when device 20 is placed in operation a radio-frequency signal is applied to wave-transmission lines 21 and 25, in push-pull relationship, from source 33. Due to the helical configuration of the windings which form the wave-transmission lines, each of lines 21 and 25 has a wave-propagation velocity in a direction parallel to reference path A which is considerably smaller than the propagation velocity of electromagnetic radiation in free space. The actual effective wave-propagation velocity of the lines is a matter of design choice and may be as low as one one-hundredth (0.01) of the free-space propagation velocity. Electrons emitted from surface 11 of cathode 10 are focused by passing through slot 13 of electrode 12 and are accelerated as they traverse slot 16 of accelerator 14, due to the positive operating potential applied to the accelerator from source $B_1+$. The electron stream is further focused by passing through aperture 17 of electrode 15, which may be held at a potential somewhat below that of accelerator 14 but positive with respect to the cathode. Preferably, the average potentials supplied to the windings of lines 21 and 25 should be different from that applied to electrode 15 from source $B_2+$, so that an electrostatic focusing lens is formed between electrode 15 and the adjacent edges of wave-transmission lines 21 and 25. The electrons of the beam continue along reference path A and are collected by electrode 18. The average beam velocity is determined by the average potential of transmission lines 21 and 25 with respect to cathode 10.

Figure 2:
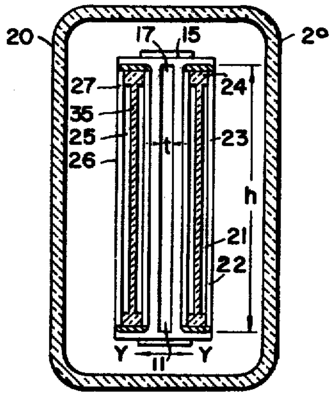
Figure 2 is a cross-sectional view taken along line 2—2 in Figure 1.

In order to reach a more complete understanding of the advantages and useful qualities of the invention, the amplifier illustrated in Figures 1 and 2 may first be considered as operating without the benefit of any collimating or focusing field tending to confine the electron beam to maximum width $d$ of reference path A. The velocity of the electron beam along path A may then be adjusted so that it is approximately equal to the wave-propagation velocity of the signal wave traveling along transmission lines 21 and 25. Each electron or group of electrons instantaneously emerging into the portion of reference path A defined by transmission line length Z is subjected to a transverse electric field established by the application of radio-frequency signals from source 33, in phase opposition, to the two transmission lines. Because the electron and wave-propagation velocities are equal, each individual electron is continuously deflected in a given direction and begins to move transversely with respect to path A as well as parallel thereto. As the electrons move away from the center plane of the reference path, they form a pattern which, by moving along the wave-transmission lines, induces a signal current in them; this induced current is 90° out of phase with respect to the original field supplied by source 33.

Interaction between the traveling-wave field and the electron stream leads to the emergence of three separate waves in place of the original signal wave; only one of the three waves grows exponentially as it travels along the transmission lines. This process has been analyzed in detail in Chapter 13 of the book by J. R. Pierce, published by D. Van Nostrand Co., Inc., New York, 1950, "Traveling-Wave Tubes."

Operation of the amplifier of Figures 1 and 2 under the conditions just described might be successful if the electrons projected from emissive surface 11 of cathode 10 all followed paths exactly parallel to reference path A and if space-charge effects could be ignored. In practice, however, this is not possible. On the average, each of the electrons emerging from electron gun 19 has some initial transverse velocity which causes the beam to disperse and, in addition, space-charge effects tend further to spread the beam. Consequently, if no provisions are made for focusing or collimating the electron beam as it traverses reference path length Z, it is extremely difficult to secure any appreciable gain from traveling-wave tube 20, since the electron beam rapidly disperses and is collected by the wave-transmission lines. Conventionally, magnetic collimating fields have been suggested to restrict the transverse excursions of the beam electrons; the structures employed to develop the magnetic collimating field, however, are considered excessively bulky and expensive for domestic television receivers and similar applications.

Figure 1A:
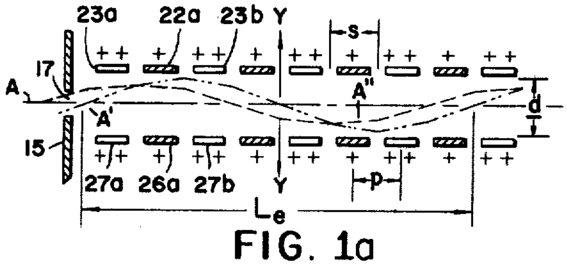

Traveling-wave tube 20, on the other hand, includes an electrostatic focusing system for confining the electron beam to maximum width $d$ of reference path A. The bifilar construction of transmission lines 21 and 25 and the capacitive coupling between the individual windings of each of the lines makes it possible to establish the individual windings of the wave-transmission lines at different D. C. or average operating potentials. Thus, winding 23 of wave-transmission line 21 may be held at an average potential which is positive with respect to winding 22 and winding 27 of line 25 may be made positive with respect to winding 26. This condition is illustrated in Figure 1*a*, which comprises a schematic representation of the portions of the conductive windings of lines 21 and 25 most closely adjacent reference path A; the relative sizes and spacing of the elements illustrated therein have been distorted somewhat in order to assist in explaining the figure and to provide more space. The radio-frequency potential resulting from the signal wave traveling along the lines is relatively small in comparison with the difference in D. C. potential between the individual windings of each line.

As shown in Figure 1*a*, an electron entering the portion of the reference path bounded by the wave-transmission lines may have a velocity component in the transverse direction indicated by arrows *y*, as well as a principal velocity component parallel to reference path center plane A. For example, a particular electron may enter the interaction space bounded by lines 21 and 25 along path A′, and, at the outset, is subjected to an electrostatic lens field determined by the average or steady-state potential difference between helix turns 23*a*, 27*a* and electrode 15. As the electron continues along path A′, it reaches the space between turns 23*a* and 27*a* on the one hand and turns 22*a* and 26*a* on the other hand. Consequently, since turns 22*a* and 26*a* are at a considerably reduced potential with respect to turns 23*a* and 27*a*, the electron encounters a convergent electron lens which tends to deflect the electron toward center plane A of the reference path. The electron continues along path A′, and, upon reaching the space bounded by turns 22*a*, 26*a* and 23*b*, 27*b*, enters another convergent electrostatic lens. Consequently, the electron is again deflected toward center plane A. Thus, as the electron proceeds along path A′ it is subjected to a periodic electrostatic lens field effectively constituting a series of convergent electrostatic lenses. The periodic electrostatic lens field tends to deflect the electron toward the reference path center plan A with a force which is proportional to the displacement of the electron from that plane; thus, the lens field is generally equivalent to a transverse elastic field and confines the electrons of the beam within maximum reference path width *d*.

The focal length of each of the electrostatic lenses formed between adjacent pairs of winding turns is proportional to the transverse line spacing *d* and to a function of the ratio between the D. C. potentials of the individual helix windings with respect to cathode 10. The focal lengths of the electrostatic lenses, in conjunction with the spacing *s* between adjacent lenses, determine the distance along path A which is traversed by an electron having a given initial transverse velocity before that electron crosses the center plane of the reference path. Consequently, as shown by trajectory A′, each electron (other than those having no initial transverse velocity) follows a substantially sinusoidal path which is symmetrical with respect to reference path center plane A. A second illustrative electron path A″ illustrates the trajectory of an electron having a different initial transverse velocity and a different point of origin than the electron following path A′. As indicated by trajectory A″, neither the magnitude of the initial transverse velocity nor the point of origin affect the wavelength $L_e$ of the sinusoidal paths followed by the individual electrons.

For a given structure, wavelength $L_e$ is determined by the strength of the lens field produced by the D. C. potential difference between the individual windings and by their average D. C. potential, which determines the average velocity of the electron stream. As each electron follows its individual trajectory, it carries out a transverse harmonic motion at a frequency $w_e$ equal to its average velocity divided by wavelength $L_e$. This transverse motion is analogous to the motion of a mechanical resonator such as a vibrating reed; a periodic force at the natural frequency of such a resonator produces a periodic motion of linearly increasing amplitude. Consequently, the electron stream may be said to exhibit a transverse resonance at the frequency $w_e$.

The frequency of the signal supplied from source 33 may be designated $w_o$ and the propagation velocity of the undisturbed signal wave traveling along the lines may be taken as $v_o$. The average velocity of the electrons may be designated $v_e$.

By proper choice of the average operating potentials applied to the wave-transmission lines, the velocity of the electron beam may be adjusted so that $$v_e = v_o\left(1+\frac{w_e}{w_o}\right) \quad (1)$$

Under these conditions, the individual electrons of the beam are subjected to a periodically changing signal field having a frequency $w_e$; since the electrons tend to resonate at that frequency, they begin to move at increasing amplitudes in the *y* direction. It should be recalled that the electrostatic lens field is relatively strong in comparison to the signal wave field, so that the transverse excursions induced by the signal field are insufficient to cause electrons to be collected by the wave-transmission lines.

Under the conditions described immediately above, the current induced in wave-transmission lines 21 and 25 by the pattern of transversely vibrating electrons moving along path A is in phase with the signal wave applied from source 33, so that gain is achieved. The amplitude of the signal wave, as the wave travels along the line, may be expressed as $$E = \tfrac{1}{2}E_0(e^{az}+e^{-az}) \quad (2)$$

where $E_0$ is the initial amplitude of the signal applied by source 33, *e* is the natural logarithmic base, *z* is the distance along the wave-transmission lines, and *a* is the growth constant of the signal wave. In the conventional longitudinal-mode traveling wave tube, the growth constant is determined by a cubic expression, whereas in tube 20 growth constant *a* may be represented by a quadratic equation. This indicates that an exponentially attenuated wave as well as an exponentially growing wave should exist along wave-transmission lines 21 and 25; this has been determined to be true. The fact that the initially applied signal is divided into these two waves accounts for the factor ½ in Equation 2. For a tube which is sufficiently long to afford substantial gain, the attenuated wave may be neglected, as compared to the amplified wave, so that a simplified expression for the gain of such a long tube is $$E = \tfrac{1}{2}E_0e^{az} \quad (3)$$

This compares quite favorably with a conventional velocity-modulation traveling-wave tube, in which the cubic expression for the growth constant leads to division of the applied signal into three waves, so that the equation for a long tube includes a factor of only ⅓ instead of ½.

It should be noted that the phase conditions within tube 20 which result in the direct addition of the induced current to the signal current in wave-transmission lines 21 and 25 prevail accurately only so long as the amplitude of the signal field does not change along the length of the wave-transmission lines. Actually, the signal field increases continuously, so that a phase error occurs. This phase error, however, is relatively small and may be readily eliminated by minor adjustments in either the transverse resonance frequency or the electron beam velocity.

In order to achieve effective operation of tube 20, several conditions should be met. To avoid difficulties presented by lens aberrations, the spacing *s* between adjacent lenses, defined as the spatial period (Figures 1 and 1*a*), should be greater than three times the maximum width *d* of reference path A (this condition has not been followed in Figures 1 and 1*a* to avoid overcrowding). The effective wavelength $L_e$ of the lens field (Figure 1*a*) should be equal to or greater than three times lens spacing *s*. Furthermore, transmission line length Z must be large in relation to the effective wavelength of the signal wave as it travels along the wave-transmission lines; this latter condition must be met in order to achieve appreciable gain. All of the dimensional and operational characteristics set forth in this paragraph apply to the embodiments of the invention illustrated in Figures 3–14 as well as to the amplifier described in connection with Figures 1–2.

The electrostatic lenses established along the length of path A determine the transverse resonant frequency of the electron beam and, at the same time, confine the beam within width *d* so that it does not impinge upon the wave-transmission lines. Consequently, it is possible to make lines 21 and 25 sufficiently long to achieve useful gain from tube 20. The electrostatic lens field focuses the beam upon center plane A, as contrasted to the mere collimating action of a conventional magnetic field, so that width *d* may be held to a minimum. This facilitates close coupling between the electron beam and the wave transmission lines and permits the realization of greater amplification in a tube of given overall size.

It has been determined that the exponential gain or growth constant *a* of a transverse-mode traveling-wave tube such as device 20 is adversely affected by the addition of stray capacitance along the wave-transmission lines. In order to minimize such stray capacities, support members 24 and 35 preferably have a transverse cross-sectional area in the *y* direction which is as small as possible; in addition, the material from which the supports are formed should have a low dielectric constant. The I-shaped cross-sectional configuration for the support members illustrated in Figure 2 is advantageous for this purpose in that it presents a relatively small cross-sectional area which is largely separated from the individual helix turns. The support members may be formed from ceramic, glass, or other dielectric materials adapted for employment in vacuum tubes. Helix windings 22, 23, 26 and 27, of course, may be formed from copper, molybdenum, or any other suitable conductive material adapted for use in a vacuum.

In the embodiment of the invention illustrated in Figures 1 and 2, the electrostatic lens field employed to confine the electron beam within maximum width *d* of path A is established entirely by the potential differences between different portions of the conductive windings of wave-transmission lines 21 and 25. In this embodiment, and in all modifications to be described hereinafter, the field created by the signal wave traveling along transmission lines 21 and 25 is directly electrostatically coupled to the electron beam throughout the length of the wave-transmission lines. However, it is sometimes advantageous to construct the wave-transmission lines from lumped-constant circuit elements, so that only intermittent sections of the lines are coupled to the beam; structures of this general type which employ a series of electrostatic lenses for confining the electron beam to a reference path are described in the copending application of Robert Adler, Serial No. 394,798, now Patent No. 2,809,320, filed concurrently herewith and assigned to the same assignee as the present application. The periodic electrostatic lens structure may also be put to advantageous use in traveling-wave tubes employing a single wave-transmission line and specifically adapted for longitudinal-mode operation.

Figure 4:
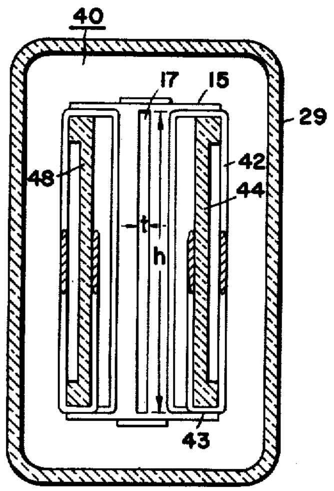
Figure 4 is a cross-sectional view taken along line 4—4 in Figure 3.
Figure 3:
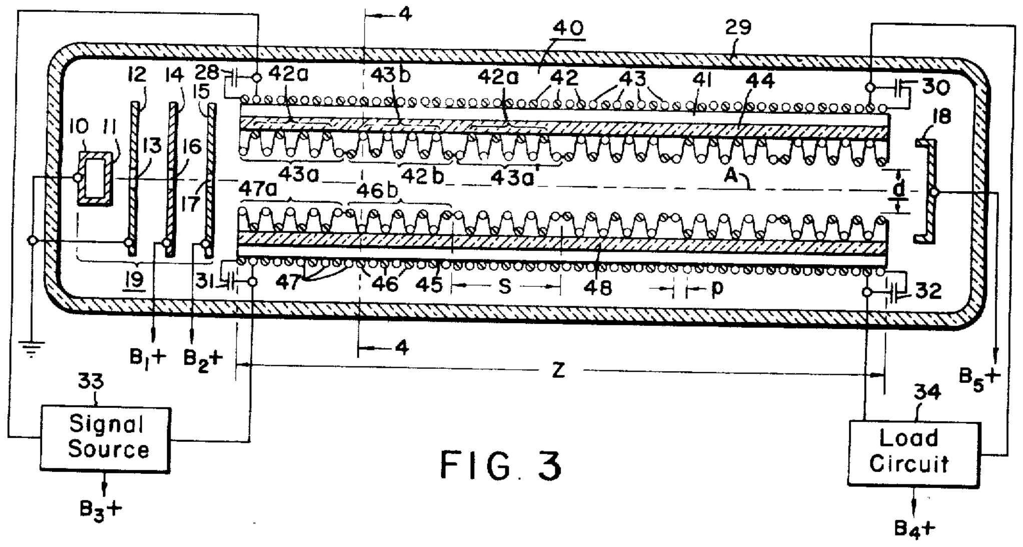
Figure 3 represents a second embodiment of the invention, as seen in cross section, portions of the structure being illustrated schematically.

In constructing the embodiment of the invention illustrated in Figures 1 and 2, it may be somewhat difficult to meet all of the requirements with respect to the relationships between the lens field wavelength $L_e$, the spacing *s* between individual lenses, and the most desirable range of wave-propagation velocities. Specifically, in that embodiment the choice of the effective pitch of the windings, which is equal to the lens spacing, becomes relatively critical. Although this difficulty is by no means insuperable and may be overcome without undue sacrifice of the gain or frequency characteristics of the device, considerably greater flexibility of design may be achieved in a construction in which the spacing between lenses is substantially greater than the pitch of the windings. Figures 3 and 4 illustrate a traveling-wave tube amplifier in which this objective is achieved.

The embodiment illustrated in Figure 3 comprises a traveling-wave tube 40 including an electron gun 19 which is essentially identical with gun 19 of Figure 1 and comprises a cathode 10, a focusing electrode 12, an accelerator 14, and a beam limiting electrode 15. As in the previously-described tube 20, electrons emitted from surface 11 of cathode 10 are formed into an electron beam by passing through apertures 13, 16 and 17 of electrodes 12, 14 and 15 respectively. The electron beam generally follows a reference path A and is collected by an electrode 18 positioned at the opposite end of tube envelope 29.

Tube 40 further comprises a first low-velocity wave-transmission line 41 which is disposed adjacent to reference path A and preferably is essentially parallel to the reference path. Wave-transmission line 41 includes a first helical conductive winding 42 which is wound in bifilar relationship with a second similar winding 43; although both windings are shown in cross-section, winding 42 is cross-hatched whereas winding 43 is unshaded so that the two windings may be easily differentiated. Transmission-line windings 42 and 43 are electrically coupled to each other for radio frequencies by capacitor 28 at the end of transmission line 41 adjacent electron gun 19, and winding 43 is connected to signal source 33. At the other end of wave-transmission line 41, the two individual helical windings are coupled together for radio frequencies by capacitor 30, and winding 42 is connected to load circuit 34.

A second low-velocity wave-transmission line 45 is disposed adjacent reference path A on the side of the reference path opposite line 41 and is of essentially similar construction. Cross-hatched helical winding 46 is wound in bifilar relationship with the unshaded winding 47 and the two windings are coupled together for radio frequencies by capacitors 31 and 32 at the electron gun and collector ends of wave-transmission line 45 respectively. Winding 47 is connected to signal source 33, whereas winding 46 is connected to load circuit 34. Transmission-line windings 43 and 47 are connected through signal source 33 to operating voltage source $B_3+$ and windings 42 and 46 are conductively connected through load circuit 34 to D. C. source $B_4+$; the unidirectional voltage sources for electrodes 14, 15 and 18 may be the same as those described in connection with Figure 1. The length Z of wave-transmission lines 41 and 45 is, of course, large relative to the effective wavelength of a signal wave traveling along the lines.

Wave-transmission lines 41 and 45 are mounted on a pair of support members 44 and 48 respectively, as shown more clearly in the cross-sectional view of Figure 4. As in the previously-described embodiment, it is preferred that support members 44 and 48 be essentially I-shaped in cross section in order to minimize the stray capacity along the wave-transmission lines, although this is not essential. Windings 42, 43, 46 and 47, as well as electrodes 12, 14, 15 and 18 may be formed from any suitable conductive material adapted for use in a vacuum tube, and support members 44 and 48 may be constructed of ceramic material, glass, or any other suitable insulating material.

As shown in Figure 3, each of the helical windings 42 and 43 comprising wave-transmission line 41 includes a plurality of groups of turns which are spaced by one distance from beam reference path A and an alternate plurality of groups of turns disposed at a substantially greater distance from the reference path. One group of turns 42*a* of winding 42 is wound in a series of recesses in support member 44; group 42*a* is followed by a group of turns 42*b* wound around the end flanges of the I-shaped support member. Turn group 42*b* is followed by another recessed group of turns 42*a'*, and the recessed and unrecessed turn groups alternate throughout the length of winding 42. Similarly, winding 43 comprises a first group of turns 43*a* disposed closely adjacent to reference path A and followed by a recessed group of turns 43*b* which, in turn, is succeeded by an unrecessed group 43*a'*. Again, the regular pattern of groups of turns spaced at different distances from the beam path is carried out throughout the length of helical winding 43. The same construction is employed for windings 46 and 47 of wave-transmission line 45. Transmission lines 41 and 45 are symmetrically disposed with respect to reference path center-plane A with the recessed and unrecessed portions of windings 42 and 43 located opposite corresponding turn groups of windings 46 and 47 respectively.

As the electrons of the beam traverse that portion of reference path A immediately adjacent turn groups 43*a* and 47*a*, they are subjected to a steady-state electrostatic field primarily determined by the average potential applied to windings 43 and 47 from source $B_3+$. Because turn groups 42 *a* and 46*a* are displaced from reference path A by a greater distance than groups 43*a* and 47*a*, they are relatively ineffective in determining the static field potential through this portion of the reference path. However, as the electrons of the stream continue toward collector 18, they enter that portion of path A generally bounded by turn groups 42*b*, 43*b*, 46*b* and 47*b*. In this region, the steady-state electrostatic field is primarily determined by the D. C. voltage applied to lines 42 and 46 from source $B_4+$, since these two windings are considerably closer to the reference path at this point than are the corresponding turn groups 43*b* and 47*b*. Consequently, a series of electrostatic lenses may be established throughout the length of reference path A, the strength of each of the lenses being determined by the average or D. C. potentials applied to windings 42 and 46 from source $B_4+$ and to windings 43 and 47 from source $B_3+$. It will be immediately apparent that under these conditions transmission lines 41 and 45 function in a manner exactly analogous with lines 21 and 25 of Figure 1 and cooperate with the electron beam projected along path A to exponentially amplify the signal supplied from source 33. As in the embodiment of Figures 1 and 2, the electron beam is confined to its path by the electrostatic lenses constituted entirely of portions of the wave-transmission lines. In tube 40, however, the spacing $s$ between lenses is very much larger than the effective pitch $p$ of the wave-transmission lines. Consequently, it is much easier to maintain lens spacing $s$ relatively large with respect to maximum permissible beam width $d$ while at the same time keeping the pitch $p$ small enough to attain the desired low velocity of wave transmission.

Figure 5:
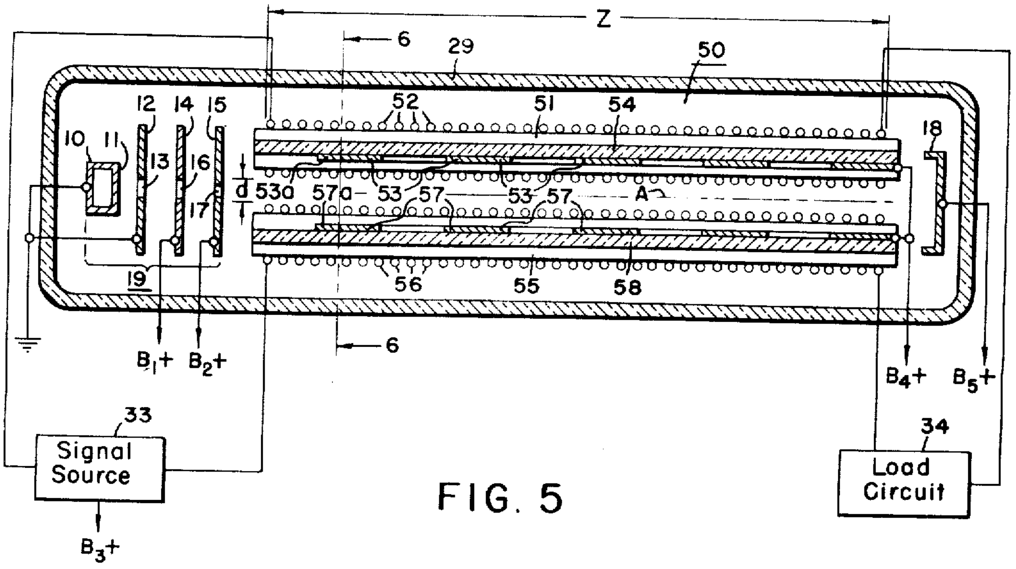
Figure 5 shows another embodiment of the invention; a portion of the device and its associated circuitry are illustrated schematically.

In Figure 5 there is illustrated an embodiment of the invention in which wave-transmission lines formed from single conductive windings are employed. This embodiment comprises a traveling-wave tube 50 including an envelope 29, an electron gun 19, and a collector 18, all of which are essentially similar to the corresponding elements of the preceding figures. As before, the electrodes are generally symmetrical with respect to a reference path A along which an electron beam is projected from cathode 10 to collector 18. In tube 50, a first low-velocity wave-transmission line 51, comprising a single helical conductive winding 52 supported by an insulating member 54, is disposed adjacent one side of reference path A intermediate gun electrode 15 and collector 18. Th end of helix 52 adjacent electron gun 19 is connected to signal source 33 and to unidirectional positive potential source $B_3+$; the other end of the helix is coupled to load circuit 34. Transmission line 51 also includes a series of conductive plates 53 spaced along support member 54 and disposed on the side of the support member nearest reference path A. This construction is more clearly illustrated in Figure 6, in which it is seen that conductive plates 53 are supported on the surface of the web of I-shaped support member 54. Plates 53 are conductively connected to each other and are further connected to D. C. voltage source $B_4+$; these connections may be made by a narrow strip of conductive material extending between adjacent plates along the edge of support 54.

A second low-velocity wave-transmission line 55 is disposed adjacent reference path A on the opposite side of the path from transmission line 51. Wave-transmission line 55 is essentially similar to line 51 and comprises a helical conductive winding 56 supported on an I-shaped insulating member 58; a plurality of conductive plates 57 are disposed along the web of support member 58 opposite conductive plates 53 of transmission line 51. Plates 57 are conductively connected to each other and are also connected to operating potential source $B_4+$. Helical winding 56 is connected to signal source 33 and D. C. voltage source $B_3+$ and is coupled to load circuit 34 in essentially the same manner as winding 52 is coupled to these elements. As before, wave-transmission lines 51 and 55 are preferably several times longer than the effective wavlength of a signal wave traveling along the lines.

When traveling-wave tube 50 is placed in operation, the electron beam developed in gun 19 is projected along reference path A and enters the region between wave-transmission lines 51 and 55 at a point where the steady-state electrostatic field is primarily determined by the potential applied to helical windings 52 and 56 from source $B_3+$. This potential may be substantially lower than the positive potential applied to conductive plates 53 and 47 from source $B_4+$. Under these conditions, the electrostatic field in that portion of path A lying between plates 53*a* and 57*a* is determined by the effective penetration of the field established by the plates through windings 52 and 56 in a manner analogous to the effect of the anode potential of a triode upon the electrostatic field existing between the grid and the cathode of that triode. Accordingly, as the electrons of the stream enter the portion of path A generally bounded by elements 53*a* and 57*a*, they are subjected to a stronger potential field and a convergent electrostatic lens is formed adjacent the edges of conductive plates 53*a* and 57*a* nearest electron gun 19. Similarly, as the electron stream approaches the trailing edge of plates 53*a* and 57*a*, the strength of the steady-state electrostatic field decreases and a second convergent electrostatic lens is formed. As the beam progresses along path A it is periodically subjected to corresponding changes in the electrostatic field strength; in other words, a series of convergent electrostatic lenses essentially similar to those described in connection with Figure 1*a* is formed along reference path A. However, in tube 50 the lenses are formed by portions of conductive windings 52 and 56 in conjunction with conductive plates 53 and 57, whereas in the embodiments of Figures 1–4 the lenses are established by the windings alone.

Figure 6:
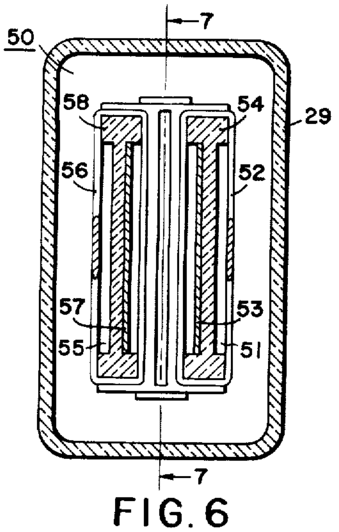
Figure 6 is a cross-sectional view of the device of Figure 5, taken along line 6—6 therein.

In the cross-sectional view of Figure 6 the relative positions of I-shaped insulating support members 54 and 58, helices 52 and 56, and conductive backing plates 53 and 57 are more clearly shown. In this particular construction, conductive backing electrodes 53 and 57 may be spaced as far as conveniently possible from helices 52 and 56 in order to prevent an undesirable increase in the transmission-line capacity, since increased capacity leads to a corresponding reduction in the characteristic impedance of the conductive windings and a resultant loss in gain. A higher potential $B_4$ is then required. On the other hand, the conductive backing plates may comprise coatings of a conductive material having a high resistivity. A relatively constant D. C. potential may be maintained on conductive plates 53 and 57, since no direct current flows in the plates; at the same time the resistivity may be made high enough so that the backing plates cannot constitute a unipotential surface or shield at radio frequencies. Conductive plates 53 and 57 then merely constitute loss elements for the wave-transmission lines. Backing plates of this type may be easily formed of a carbon or metallic deposit on the web surfaces of support members 54 and 58. It is well known that a certain amount of loss is useful in a traveling-wave tube in preventing undesired oscillation; thus the loading of the wave-transmission lines by the conductive backing element is not particularly disadvantageous.

Figure 7:
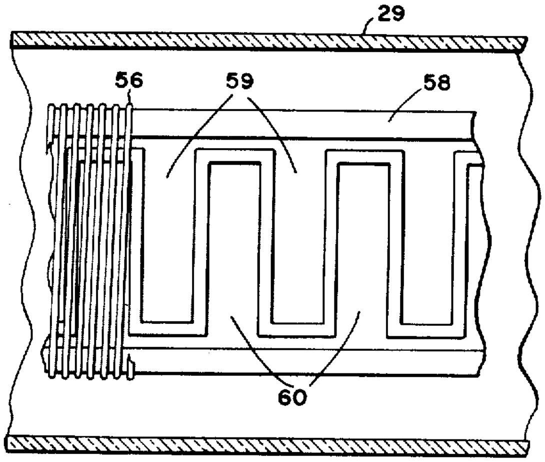
Figure 7 is a cross-sectional view of a fragmentary portion of a variant of the device illustrated in Figures 5 and 6 and taken along a line corresponding to 7—7 of Figure 6.

Figure 7 represents a modification of the structure illustrated in Figures 5 and 6; in this structure, two separate series of backing plates 59 and 60 are provided on each of the wave-transmission lines. In this modification, the periodic lens field is established by the application of different average potentials to backing plates 59 and 60; the fields established by the potentials of the backing plates penetrate the helical windings so that a periodic lens field is formed in the region of path A opposite the backing-plate edges. In all other respects, the construction shown in Figure 7 may be essentially identical with that of Figures 5 and 6 so that a detailed description of the operation of the device is unnecessary.

Figure 8:
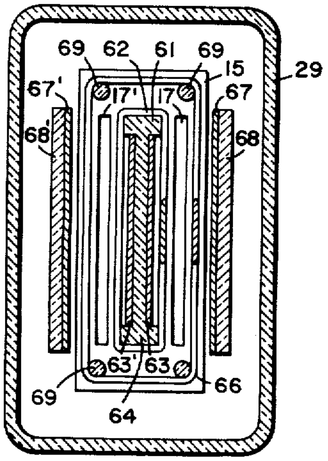
Figure 8 is a cross-sectional view, generally corresponding to Figure 6, of a further modification of the invention.

A further modification of the embodiment of the invention illustrated in Figures 5–7 is shown in Figure 8, which corresponds generally to the view of Figure 6. In this device, a first wave-transmission line 61 comprising a helical winding 62 supported on an insulating member 64 is mounted generally along the axis of envelope 29. A series of conductive backing plates 63 generally corresponding to plates 53 of Figure 5 are formed on one side of the web of I-shaped support member 64, and a similar series of backing plates 63′ are formed on the other side of the support member. A second low-velocity wave-transmission line comprising a helical winding 66 is mounted concentrically with respect to wave-transmission line 61, and two series of conductive backing plates 67 and 67′, mounted on support members 68 and 68′ respectively, are positioned along the length of the wave-transmission lines and externally thereto. Helical winding 66 may be supported by a plurality of rods 69. With this structure, two separate sheet-like electron streams projected between wave-transmission lines 61 and 66 may be employed, as indicated by apertures 17 and 17′ in electrode 15′, which corresponds to beam limiting electrode 15 of Figures 1, 3 and 5.

It will be readily apparent that the device illustrated in Figure 8 is essentially similar to that of Figures 5 and 6 except that two electron beams and four series of conductive backing plates are employed. As in Figure 5, each of the electron streams is subjected to a periodic electrostatic lens field as it traverses the lengths of the wave-transmission lines, the lens field being established by application to the backing plates of a D. C. potential which is substantially greater than that applied to the conductive windings of wave-transmission lines 61 and 66. Thus, the helical windings constitute an integral part of the lens structure. Of course, a double series of backing plates such as those illustrated in Figure 7 may be employed for each of the single plate series 63, 63′, 67, and 67′ if desired, in which event the lens field is determined by the potentials applied to the backing plates and by the transconductance of the plates with respect to the helical windings; as in all embodiments of the invention, the lens structure comprises a portion of the wave-transmission lines. It will be recognized that Figure 8 is in actuality a rectangular version of a concentric structure which may be made cylindrical in form, in which case a single annular electron beam and a transverse radial lens field may be employed.

Figure 9:
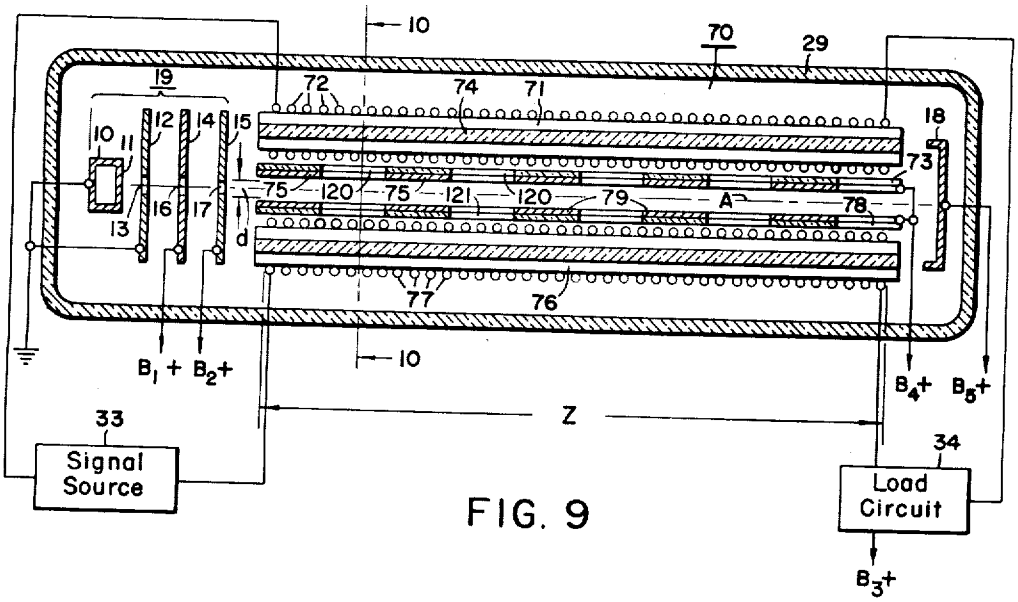
Figure 9 illustrates, in partially schematic cross section, an additional embodiment of the invention.

Figure 9 illustrates another embodiment of the invention in a view corresponding to those of Figures 1, 3 and 5. The traveling-wave tube 70 shown in Figure 9 includes an envelope 29, an electron gun 19, and a collector 18 disposed at the end of envelope 29 opposite the electron gun; these elements of the tube may be essentially similar to those of the previously-described embodiments. As before, electron gun 19 is employed to project a sheet-like beam of electrons along a reference path A, the electron stream being ultimately collected by electrode 18.

A first low-velocity wave-transmission line 71, comprising a helical conductive winding 72 mounted on a support member 74, is positioned within envelope 29 adjacent electron beam path A. A relatively thin strip 73 of insulating material, such as mica, is disposed between conductive winding 72 and reference path A, and a series of electrically conductive coatings 75 are disposed along the surface of strip 73 adjacent the reference path, being separated from each other by a plurality of apertures or windows 120. Conductive coatings 75 may be essentially similar to the conductive backing plates employed in the structures of Figures 5–8, and may comprise a thin metallic or carbon coating deposited on surface strip 73. Conductive coatings 75 are electrically connected to each other and to D. C. voltage source $B_4+$, whereas winding 72 is coupled to signal source 33 and load circuit 34. A second transmission line 76, which is essentially similar in construction to line 71, is positioned along reference path A on the side of the path opposite line 71. Low-velocity line 76 comprises a conductive winding 77 coupled to signal source 33 and load circuit 34, an insulating supporting strip 78 interposed between winding 77 and reference path A, and a series of high-resistivity conductive coatings 79 disposed along the surface of strip 78 facing reference path A opposite coatings 75. Coatings 79 are separated from each other by a series of windows 121 and are connected to each other and to operating potential source $B_4+$. In addition, conductive windings 72 and 77 are connected to D. C. voltage source $B_3+$ through load circuit 34. In lieu of providing apertures or windows 120 and 121, each of supporting strips 73 and 78 may be provided with two sets of conductive coatings operated at different D. C. potentials, as in the embodiment of Figure 7.

Figure 10:
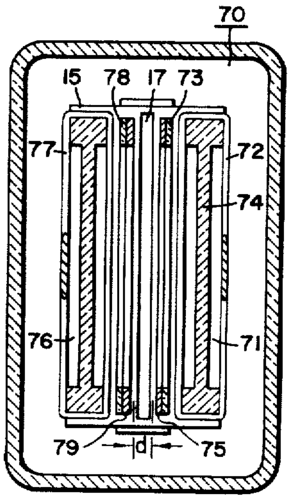
Figure 10 is a cross-sectional view taken along line 10—10 in Figure 9.

The relative positions of wave-transmission lines 71 and 76 are more clearly illustrated in the cross-sectional view of Figure 10. As seen therein, the wave-transmission line support members are formed from dielectric material and are preferably essentially I-shaped in cross-sectional configuration. Supporting strips 73 and 78 are mounted closely adjacent windings 72 and 77 and are interposed between the windings and the electron beam, which is projected through slot 17.

In operation, tube 70 is essentially similar to the previously-described embodiments. As before, a balanced radio-frequency signal is applied between wave-transmission lines 71 and 76, and travels along the wave-transmission lines at a relatively low velocity. The radio-frequency field developed by this signal is electrostatically coupled to the electron beam throughout length Z of reference path A, due to the fact that the extremely thin insulating support members 73 and 78 do not appreciably obstruct the high-frequency signal field. Furthermore, coatings 75 and 79 have a sufficiently high resistance so that they do not form unipotential surfaces or shields at radio frequencies. The D. C. potential applied to conductive coatings 75 and 79 establishes a series of regions of relatively high positive potential interspersed with regions of lower potential along reference path A, and a series of electrostatic lenses is established along the reference path. Consequently, the electron stream is subjected to an electrostatic lens field which establishes a transverse resonance frequency for the electron beam and at the same time confines the beam to path A. As in the embodiments of Figures 1–8, the wave-transmission lines constitute a part of the lens structure, and traveling-wave tube 70 functions in a manner analogous to the previously-described devices 20, 40 and 50. It will be understood that two separate and interleaved series of coatings may be applied to each of support strips 73 and 78 in a manner analogous to the structure of Figure 8, in which case apertures 120 and 121 are not employed.

Figure 11:
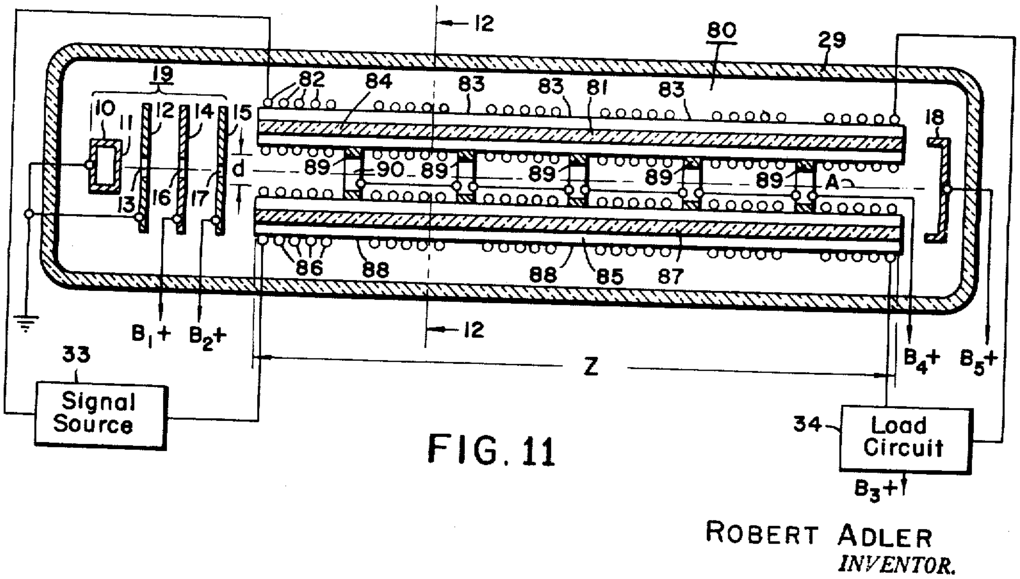
Figure 11 is a cross-sectional partially schematic view of another embodiment of the invention.

Figure 11 shows an additional embodiment of the invention comprising a traveling-wave tube 80 which again includes an electron gun 19 for projecting an electron stream along a reference path A to a collector 18. Tube 80 further includes a wave-transmission line 81 having a relatively low wave-propagation velocity and comprising a conductive helical winding 82 mounted upon a support member 84; the support member is preferably formed from ceramic or some other electrical insulating material suitable for use in a vacuum. Winding 82 is not of uniform pitch throughout the length of wave-transmission line 81; instead, it includes a series of open or unfilled areas 83 each bridged by a single helix turn. A second wave-transmission line 85 is included within device 80 and is positioned on the side of reference path A opposite wave-transmission line 81. Transmission line 85 is essentially similar to line 81 and includes a helical winding 86 supported by a longitudinal support member 87. As in the case of winding 82 of line 81, helix 86 is not wound with uniform pitch throughout its length but includes a series of bridged areas 88. Wave-transmission lines 81 and 85 are equally spaced from the center plane of reference path A with corresponding elements of the two lines located opposite each other; each of the wave-transmission lines is several times as long as the effective wavelength of a signal wave traveling along the lines parallel to path A.

Traveling-wave tube 80 also includes a series of lens electrodes 89 disposed between wave-transmission lines 81 and 85 at positions corresponding to the open or bridged portions 83 and 88 of windings 82 and 86. Each of lens electrodes 89 includes a window or aperture 90 aligned with reference path A to permit passage of the electron beam. The lens electrodes are conductively connected to each other and to D. C. voltage source $B_4+$. The ends of transmission-line windings 82 and 86 adjacent electron gun 19 are coupled in push-pull relationship to signal source 33, whereas the ends of the lines nearest collector 18 are connected to load circuit 34 and to voltage source $B_3+$; if preferred, the connection to operating potential source $B_3+$ may be made through input signal source 33.

Figure 12:
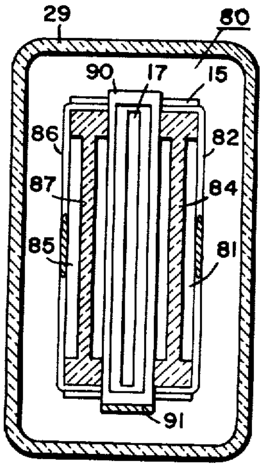
Figure 12 is a view in cross section taken along line 12—12 in Figure 11.

Tube 80 is shown in transverse cross section in Figure 12, in which it is seen that the tube is essentially similar in configuration to the embodiments of Figures 2, 4, 6 and 10. As illustrated in Figure 12, apertures 90 are essentially rectangular in configuration and define the maximum width *d* of the reference path. The lens electrodes may be conveniently connected to each other by means of a conductive strap 91 positioned externally to the remainder of the electrode system at a considerable distance from path A.

In operation, traveling-wave tube 80 is in most respects essentially similar to the previously-presented embodiments. Lens electrodes 89 are held at a fixed D. C. potential by virtue of the connection to source $B_4+$, whereas source $B_3+$ applies a different steady-state potential to transmission line windings 82 and 86. Consequently, a series of convergent electrostatic lenses is established between lens electrodes 89 and the adjacent groups of turns of windings 82 and 86. Device 80 therefore develops a periodic electrostatic lens field which serves to confine the electron beam to reference path A throughout substantially the entire length Z of the wave-transmission lines and at the same time establishes a transverse electron-resonance frequency for the beam. Consequently, tube 80 functions in a manner essentially similar to the previously-described embodiments of the invention. Furthermore, the structure employed in tube 80 is particularly advantageous in that it avoids the use of backing plates or similar elements and thus avoids the addition of undesirable stray capacity to the wave-transmission lines. Again, the lens structures of tube 80 include portions of the wave-transmission lines.

Figure 13:
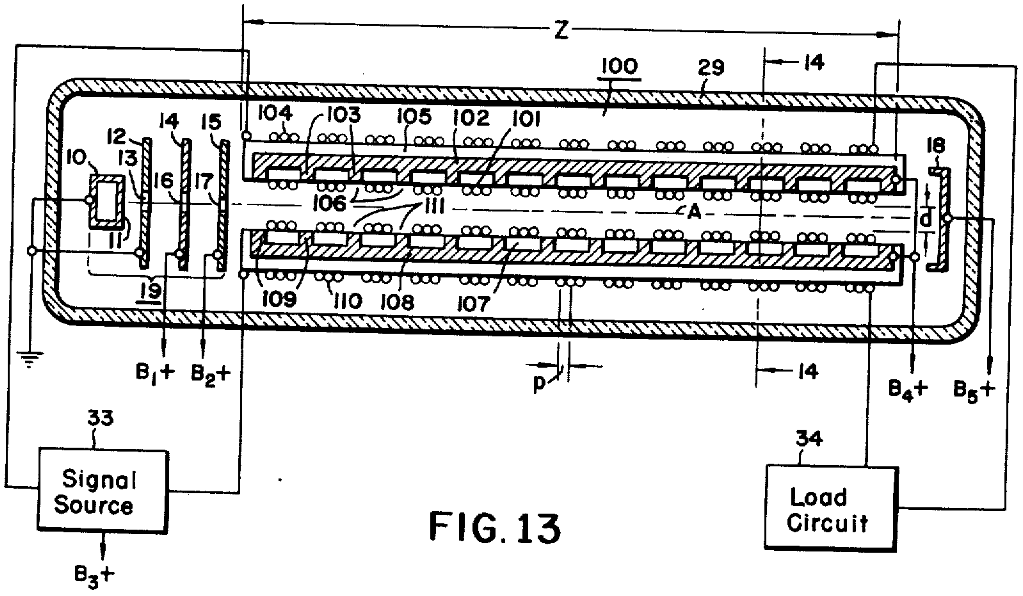
Figure 13 illustrates, in partially schematic cross section, a further modification of the invention.

Figure 13 illustrates a further modification of the invention which is in many respects essentially similar to that of Figure 11. As in the previously-described embodiments, the traveling-wave tube 100 shown in cross section in Figure 13 comprises an electron gun 19 which projects a beam of electrons along reference path A to a collector 18. Tube 100 further includes a first low-velocity wave-transmission line 101 which is disposed substantially parallel to path A intermediate the final gun electrode 15 and collector 18. Wave-transmission line 101 includes a support member 102 provided with a plurality of flanges or lens elements 103 extending toward reference path A. Preferably, support member 102 and lens elements 103 are formed from a single piece of conductive material. A helical conductive winding 104 is mounted upon support member 102 and is insulated from the support member by a pair of insulating strips 105.

Figure 14:
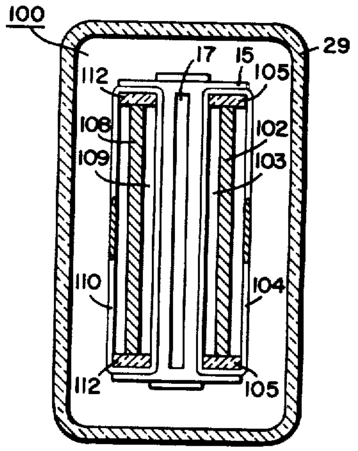
Figure 14 is a view in cross section taken along line 14—14 in Figure 13.

The relative positions of support member 102, lens elements 103, helix 104 and insulating strips 105 are more clearly shown in Figure 14; as indicated therein, that portion of helical winding 104 most closely adjacent path A is maintained approximately co-planar with the extremities of lens elements 103. Insulating strips 105 may be formed from mica or any other insulator suitable for use in a vacuum and may be notched or otherwise recessed to receive helical winding 104.

As indicated in Figure 13, winding 104 is not of uniform pitch throughout length Z of wave-transmission line 101; rather, the winding includes a series of open spaces 106, each bridged by a single turn of the helix. Helix 104 is wound so that open spaces 106 correspond in position to lens elements 103.

Traveling wave tube 100 also includes a second low-velocity wave-transmission line 107 which is disposed on the side of reference path A opposite transmission line 101. Wave-transmission line 107 is essentially identical, both physically and electrically, with line 101, and includes a conductive support member 108 having a plurality of lens element extensions 109 corresponding in number and position to lens elements 103 of line 101. Transmission line 107 further comprises a conductive helical winding 110 having a plurality of open or bridged spaces 111 corresponding to lens elements 109; winding 110 is insulated from support member 108 and lens elements 109 by a pair of insulating strips 112, as indicated in Figure 14. The relative positions of lines 101 and 107 along path A are best indicated in Figure 13; as shown therein, lens elements 103 of line 101 are located directly opposite the corresponding lens elements 109 of wave-transmission line 107 so that the two wave-transmission lines are disposed symmetrically with respect to reference path A.

The ends of conductive windings 104 and 110 adjacent electron gun 19 are connected to signal source 33 and to operating potential $B_3+$, whereas the other ends of the windings are coupled to load circuit 34. Conductive support members 102 and 108, on the other hand, are connected together and to D. C. voltage source $B_4+$. The operating voltage connections for the electron gun elements and for collector 18 may be the same as in the previously-described embodiments of the invention.

When the amplifier illustrated in Figure 13 is placed in operation, a potential difference is established between each of the lens electrodes 103 and 109 and the adjacent portions of helical windings 104 and 110. Consequently, a series of electrostatic lenses is established along length Z of reference path A so that tube 100 develops a periodic electrostatic lens field which confines the electron beam to maximum permissible width $d$ of the reference path and at the same time establishes a transverse resonance frequency for the beam. The amplifier of Figures 13 and 14 therefore functions in a manner analogous to the embodiments of the invention described in connection with Figures 1–12. It should be noted that tube 100 is particularly advantageous in its simplicity of construction from parts adapted to mass fabrication methods. As in each of the previously-described embodiments, the lens structures comprise portions of the wave-transmission lines.

Each of the traveling-wave tube amplifiers described in connection with the several figures of the drawings provides relatively constant amplification throughout a broad band of frequencies; more specifically, these amplifiers may be constructed to provide substantially constant amplification throughout the U. H. F. television range of frequencies. The traveling-wave tubes of the invention are relatively small and are well suited for mounting in a domestic television receiver or similar device. This is particularly true because these devices do not require an external magnetic structure for developing a magnetic collimating field in order to confine the electron beam to its desired path. Furthermore, since the electrostatic lens systems employed by the invention effectively focus the electron stream about a center plane rather than merely collimating the electrons with respect to paths parallel to such a plane, they are inherently more effective in restricting dispersion of the beam which might result from thermal and space-charge effects. The invention therefore permits the use of substantially narrower beams and effectively permits a greater degree of coupling between the beam and the signal wave traveling along the transmission lines. The wave-transmission line structures employed are relatively simple in form and may be readily constructed by known methods, so that the tubes are not unduly expensive if manufactured on a mass production basis.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An electron-discharge device of the traveling-wave type comprising: an electron gun, including an electron emissive cathode, for projecting a beam of electrons along a reference path of predetermined maximum width; a wave-transmission line comprising a helical conductive winding, at least a portion of which is disposed adjacent said reference path and electrostatically coupled to said electron beam, having a substantially uniform low wave-propagation velocity in a direction parallel to said reference path and further having a length in said direction which is large relative to the effective wave length of a radio-frequency signal wave traveling along said line; means for applying a radio-frequency signal to said wave-transmission line to establish said traveling signal wave and thereby to provide a traveling electric signal field which propagates along said reference path at said low wave-propagation velocity; and means, including at least a portion of said wave-transmission line, for providing a plurality of convergent electrostatic lenses periodically distributed along said reference path, with a spatial period substantially larger than the spacing intermediate adjacent turns of said helical conductive winding, to confine said electron beam within said reference path, whereby said electron beam interacts with said traveling signal wave to provide substantial reinforcement thereof.

2. An electron-discharge device in accordance with claim 1, in which said cathode is elongated to produce a sheet-like electron beam and in which said electron gun contains a beam-limiting electrode having a beam-limiting slot of predetermined width for intercepting a major portion of the electrons emitted from said cathode.

3. An electron-discharge device of the transverse mode traveling-wave type comprising: an electron gun, including an electron emissive cathode, for projecting a beam of electrons along a reference path of predetermined maximum width; a pair of substantially identical wave-transmission lines symmetrically disposed individually adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including at least a portion of each of said pair of wave-transmission lines, for providing a plurality of convergent electrostatic lenses periodically distributed along said reference path, with a spatial period which is greater than three times said maximum width of said reference path, to co-act with said traveling transverse electric signal field to induce transverse undulations of said electron beam and to substantially confine said transverse undulating beam within said reference path, whereby said undulating beam interacts with said traveling signal wave to provide substantial reinforcement thereof.

4. An electron-discharge device of the transverse-mode traveling-wave type comprising: an electron gun, including an electron emissive cathode, for projecting a beam of electrons along a reference path of predetermined maximum width; a pair of substantially identical wave-transmission lines symmetrically disposed individually adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including at least a portion of each of said pair of wave-transmission lines, for providing a plurality of convergent electrostatic lenses periodically distributed along said reference path, with a spatial period substantially larger than the transverse spacing intermediate said pair of wave-transmission lines, to co-act with said traveling transverse electric signal field to induce transverse undulations of said electron beam and to substantially confine said transverse undulating beam within said reference path, whereby said undulating beam interacts with said traveling signal wave to provide substantial reinforcement thereof.

5. An electron-discharge device of the transverse mode traveling-wave type comprising: an electron gun, including an electron emissive cathode, for projecting a beam of electrons along a reference path of predetermined maximum width; a pair of substantially identical wave-transmission lines, each comprising a pair of bifilar helical windings, symmetrically disposed adjacent opposite sides of said reference path, each of said pair of wave-transmission lines having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including means for maintaining each of said helical windings of each of said wave-transmission lines at a unidirectional potential substantially different from the other winding of said line and equal to the steady-state potential of the corresponding winding of the other of said lines, for providing a series of convergent electrostatic lenses periodically distributed along said reference path, with a spatial period which is substantially larger than the transverse spacing intermediate said pair of wave-transmission lines, to co-act with said traveling transverse electric signal field to induce transverse undulations of said electron beam and to substantially confine said transverse undulating beam within said reference path, whereby said undulating beam interacts with said traveling signal wave to provide substantial reinforcement thereof.

6. An electron-discharge device of the transverse-mode traveling-wave type comprising: an electron gun, including an electron emissive cathode, for projecting a beam of electrons along a reference path of predetermined maximum width; a first wave-transmission line disposed adjacent one side of said reference path, comprising two bifilar conductive helical windings each having a plurality of groups of turns alternately spaced from said reference path by different distances, at least a portion of each of said windings being electrostatically coupled to said electron beam, said wave-transmission line having a substantially uniform low wave-propagation velocity in a direction parallel to said reference path and further having a length in said direction which is large relative to the effective wave length of a radio-frequency signal wave traveling along said line; a second bifilar helical wave-transmission line, essentially identical in construction with said first wave-transmission line, disposed adjacent the side of said reference path opposite said one side in symmetrical relation with said first wave-transmission line; means for applying a radio-frequency signal to said wave-transmission lines in push-pull relationship to establish said traveling signal wave and thereby to provide a traveling transverse electric signal field intermediate said wave-transmission lines which propagates along said reference path at said low wave-propagation velocity; and means for maintaining each of said helical conductive windings of each of said wave-transmission lines at a unidirectional potential substantially different from the other helical winding of said line and equal to the steady-state potential of the corresponding helical winding of the other of said lines, to establish a series of electrostatic lenses periodically distributed along said reference path, with a spatial period substantially larger than the spacing intermediate adjacent turns of said conductive helical windings, to co-act with said traveling transverse electric signal field to induce transverse undulations of said electron beam and to substantially confine said undulating beam within said reference path, whereby said undulating beam interacts with said traveling signal wave to provide substantial reinforcement thereof.

7. An electron-discharge device of the transverse-mode traveling-wave type comprising: an electron gun, including an electron emissive cathode, for projecting an electron beam along a reference path of a predetermined maximum width; a pair of substantially identical wave-transmission lines symmetrically disposed adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a series of conductive elements disposed adjacent said reference path, for providing a plurality of convergent electrostatic lenses periodically distributed along said reference path, with a spatial period substantially larger than the transverse distance intermediate said pair of wave-transmission lines, to co-act with said traveling transverse electric signal field to induce transverse undulations of said electron beam and to substantially confine said undulating beam within said reference path, whereby said undulating beam interacts with said traveling signal wave to provide substantial reinforcement thereof.

8. An electron-discharge device of the transverse-mode traveling-wave type comprising: an electron gun, including an electron emissive cathode, for projecting a sheet-like beam of electrons along a reference path of predetermined maximum width; a pair of substantially identical wave-transmission lines symmetrically disposed adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a series of interconnected conductive plates symmetrically disposed along opposite sides of said reference path in spaced relation thereto, for providing a plurality of convergent electrostatic lenses periodically distributed along said reference path, with a spatial period substantially larger than the transverse distance intermediate said pair of wave-transmission lines, to co-act with said traveling transverse electric signal field to induce transverse undulations of said electron beam and to substantially confine said undulating beam within said reference path, whereby said undulating beam interacts with said traveling signal wave to provide substantial reinforcement thereof.

9. An electron-discharge device of the transverse mode traveling-wave type comprising: an electron gun, including an electron emissive cathode, for projecting a sheet-like beam of electrons along a reference path of predetermined maximum width; a pair of substantially identical wave-transmission lines each comprising an insulating support member and a helical conductive winding supported by said support member, at least a portion of which is disposed adjacent said reference path and is electrostatically coupled to said electron beam, said wave-transmission lines each having a low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a series of interconnected high-resistivity conductive plates periodically disposed along the length of each of said support members on the sides thereof adjacent said reference path and individually of a length in said direction substantially larger than the spacing intermediate adjacent turns of said helical conductive windings and further including means for maintaining said resistive plates at a unidirectional potential substantially different from the average potential of said wave-transmission lines, for providing a plurality of convergent electrostatic lenses periodically distributed along said reference path, with a spatial period substantially larger than said spacing, to co-act with said traveling transverse electric signal field to induce transverse undulations of said electron beam and to substantially confine said undulating beam within said reference path, whereby said undulating beam interacts with said traveling signal wave to provide substantial reinforcement thereof.

10. An electron-discharge device of the transverse-mode traveling-wave type comprising: an electron gun, including an electron emissive cathode, for projecting a sheet-like electron beam along a reference path of predetermined maximum width; a pair of substantially identical wave-transmission lines, each comprising a helical conductive winding, symmetrically disposed adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a series of high-resistivity conductive plates symmetrically interposed between each of said wave-transmission lines and said reference path and individually of a length in said direction which is substantially greater than the spacing intermediate adjacent turns of said helical conductive windings, for providing a plurality of convergent electrostatic lens periodically distributed along said reference path, with a spatial period substantially larger than said spacing, to co-act with said traveling transverse electric signal field to induce transverse undulations of said electron beam and to substantially confine said undulating beam within said reference path, whereby said undulating beam interacts with said traveling signal wave to provide substantial reinforcement thereof.

11. An electron-discharge device of the transverse-mode traveling-wave type comprising: an electron gun, including an electron emissive cathode, for projecting a sheet-like electron beam along a reference path of predetermined maximum width; a pair of substantially identical wave-transmission lines, each comprising a helical conductive winding, symmetrically disposed adjacent opposite sides of said reference path, each of said pair having at least a portion thereof electrostatically coupled to said electron beam and having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; two strips of insulating material individually interposed between each of said wave-transmission lines and said reference path; and means, including a portion of each of said pair of wave-transmission lines and a series of interconnected high-resistivity coatings of conductive material periodically disposed along the length of each of said strips on the sides thereof adjacent said reference path and individually of a length in said direction which is substantially greater than the spacing intermediate adjacent turns of said helical conductive windings and further including means for maintaining said conductive coatings at a unidirectional potential substantially different from the average potential of said wave-transmission lines, for providing a plurality of convergent electrostatic lenses periodically distributed along said reference path, with a spatial period substantially larger than said spacing, to co-act with said traveling transverse electric signal field to induce transverse undulations of said electron beam and to substantially confine said undulating beam within said reference path, whereby said undulating beam interacts with said traveling signal wave to provide substantial reinforcement thereof.

12. An electron-discharge device of the transverse-mode traveling-wave type comprising: an electron gun, including an electron emissive cathode, for projecting a beam of electrons along a reference path of predetermined maximum width; a pair of substantially identical wave-transmission lines symmetrically disposed adjacent opposite sides of said reference path, each of said pair comprising a conductive helical winding having at least a portion thereof electrostatically coupled to said electron beam and presenting a plurality of bridged open spaces, said pair of wave-transmission lines having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a plurality of apertured lens electrodes disposed along said reference path at points corresponding to said bridged spaces in said lines, for providing a plurality of convergent electrostatic lenses periodically distributed along said reference path, with a spatial period substantially larger than the spacing intermediate adjacent turns of said helical conductive windings, to co-act with said traveling transverse electric signal field to induce transverse undulations of said electron beam and to substantially confine said undulating beam within said reference path, whereby said undulating beam interacts with said traveling signal wave to provide substantial reinforcement thereof.

13. An electron-discharge device of the transverse-mode traveling-wave type comprising: an electron gun, including an electron emissive cathode, for projecting a beam of electrons along a reference path of predetermined maximum width; a pair of substantially identical wave-transmission lines symmetrically disposed adjacent opposite sides of said reference path, each of said pair comprising a conductive helical winding having at least a portion thereof electrostatically coupled to said electron beam and presenting a plurality of bridged open spaces, said pair of wave-transmission lines having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including at least a portion of each of said pair of wave-transmission lines and a plurality of apertured lens electrodes electrically connected to each other and disposed along said reference path at points corresponding to said bridged spaces in said lines and further including means for maintaining said lens electrodes at a unidirectional potential substantially different from the average potential of said pair of wave-transmission lines, for providing a plurality of convergent electrostatic lenses periodically distributed along said reference path, with a spatial period substantially larger than the spacing intermediate adjacent turns of said conductive helical windings, to co-act with said traveling transverse electric signal field to induce transverse undulations of said electron beam and to substantially confine said undulating beam within said reference path, whereby said undulating beam interacts with said traveling signal wave to provide substantial reinforcement thereof.

14. An electron-discharge device of the transverse-mode traveling-wave type comprising: an electron gun, including an electron emissive cathode, for projecting a sheet-like beam of electrons along a reference path of predetermined maximum width; a pair of substantially identical wave-transmission lines symmetrically disposed adjacent opposite sides of said reference path, each of said pair having at least a portion thereof electrostatically coupled to said electron beam and comprising a support member and a conductive helical winding supported by said support member and presenting a series of bridged openings, said pair of wave-transmission lines having a substantially uniform low wave-propagation velocity in a direction parallel to said reference path and further having a length in said direction which is large relative to the effective wave length of a radio-frequency signal wave traveling along said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means, including a portion of each of said pair of wave-transmission lines and a series of interconnected conductive lens elements which extend from said support members at points corresponding to said bridged openings and which are insulated from said wave-transmission lines, for providing a plurality of convergent electrostatic lenses periodically distributed along said reference path, with a spatial period substantially larger than the spacing intermediate adjacent turns of said helical conductive windings, to co-act with said traveling transverse electric signal field to induce transverse undulations of said electron beam and to substantially confine said undulating beam within said reference path, whereby said undulating beam interacts with said traveling signal wave to provide substantial reinforcement thereof.

15. An electron-discharge device of the transverse-mode traveling-wave type comprising: an electron gun, including an electron emissive cathode, for projecting a sheet-like beam of electrons along a reference path of predetermined maximum width; a first wave-transmission line, disposed along one side of said reference path and having at least a portion thereof electrostatically coupled to said electron beam, comprising a high-resistivity conductive support member and a conductive helical winding presenting a series of bridged openings, supported by said support member and insulated therefrom, said wave-transmission line having a substantially uniform low wave-propagation velocity in a direction parallel to said reference path and further having a length in said direction which is large relative to the effective wave length of a radio-frequency signal traveling along said lines; a series of conductive lens elements extending from said support member into predetermined spaced relation with respect to said reference path at points along said support member which correspond to said bridged openings in said helical winding; a second wave-transmission line, essentially identical with said first wave-transmission line, disposed adjacent the opposite side of said reference path; a second series of conductive lens elements extending from the support member of said second wave-transmission line and disposed immediately opposite said conductive lens elements of said first line so that said lens elements comprise a plurality of apertured lens electrodes disposed along said reference path at points corresponding to said bridged spaces in said lines; means for applying a radio-frequency signal to said pair of wave-transmission lines in push-pull relationship to establish said traveling signal wave and thereby to provide a traveling transverse electric signal field intermediate said pair of wave-transmission lines which propagates along said reference path at said low wave-propagation velocity; and means for maintaining said high-resistivity conductive support members at a unidirectional potential substantially different from the average potential of said wave-transmission lines to establish a plurality of convergent electrostatic lenses along said reference path with a spatial period substantially larger than the spacing intermediate adjacent turns of said helical conductive windings, to co-act with said traveling transverse electric signal field to induce transverse undulations of said electron beam and to substantially confine said undulating beam within said reference path, whereby said undulating beam interacts with said traveling signal wave to provide substantial reinforcement thereof.

References Cited in the file of this patent

UNITED STATES PATENTS

| | | |
|---|---|---|
| 2,064,469 | Haeff | Dec. 15, 1936 |
| 2,172,735 | Knoll | Sept. 12, 1939 |
| 2,206,387 | Bruche | July 2, 1940 |
| 2,233,779 | Fritz | Mar. 4, 1941 |
| 2,489,082 | De Forest | Nov. 22, 1949 |
| 2,647,219 | Touraton et al. | July 28, 1953 |
| 2,720,609 | Bruck et al. | Oct. 11, 1955 |
| 2,725,499 | Field | Nov. 29, 1955 |
| 2,760,102 | Field | Aug. 21, 1956 |